United States Patent
Hsiao

(10) Patent No.: US 10,625,945 B2
(45) Date of Patent: Apr. 21, 2020

(54) BOTTLE STOPPING APPARATUS

(71) Applicant: CVC TECHNOLOGIES INC, Taichung (TW)

(72) Inventor: Yu-Ting Hsiao, Taichung (TW)

(73) Assignee: CVC TECHNOLOGIES INC, Taichung (TW)

( * ) Notice: Subject to any disclaimer, the term of this patent is extended or adjusted under 35 U.S.C. 154(b) by 0 days.

(21) Appl. No.: 16/257,009

(22) Filed: Jan. 24, 2019

(65) Prior Publication Data
US 2019/0283968 A1 Sep. 19, 2019

(30) Foreign Application Priority Data
Mar. 16, 2018 (TW) .............................. 107203397 A

(51) Int. Cl.
*B65G 15/58* (2006.01)
(52) U.S. Cl.
CPC ...... *B65G 15/58* (2013.01); *B65G 2201/0244* (2013.01)
(58) Field of Classification Search
CPC ..................................................... B65G 15/58
USPC ............ 198/367.1, 367.2, 442, 459.1, 459.6, 198/459.7
See application file for complete search history.

(56) References Cited

U.S. PATENT DOCUMENTS

| | | | | |
|---|---|---|---|---|
| 5,887,699 | A * | 3/1999 | Tharpe ................... | B07C 3/065 198/367 |
| 5,924,546 | A * | 7/1999 | Funaya ................. | B65G 47/256 198/395 |
| 6,360,871 | B1 * | 3/2002 | Meyer ................... | B65B 21/245 198/419.1 |
| 7,481,309 | B2 * | 1/2009 | Wagner .................. | B65G 17/26 198/418.1 |
| 8,544,634 | B2 * | 10/2013 | Fourney ................. | B65G 47/29 198/779 |
| 8,944,236 | B2 * | 2/2015 | Fourney ................. | B65G 13/06 198/459.6 |
| 8,967,942 | B2 * | 3/2015 | Torsten ................ | B65G 57/303 414/788.9 |
| 9,415,948 | B1 * | 8/2016 | Burchell .............. | B65G 47/088 |
| 9,554,581 | B2 * | 1/2017 | Willburger ........... | A22C 11/008 |
| 10,343,850 | B2 * | 7/2019 | Rabec .................. | B65G 47/715 |

* cited by examiner

*Primary Examiner* — Douglas A Hess
(74) *Attorney, Agent, or Firm* — Bruce Stone LLP; Joseph A. Bruce

(57) ABSTRACT

A bottle conveyor includes a platform and a bottle-stopping apparatus. The bottle-stopping apparatus includes a driving unit, a following unit, a transmission and two stoppers. The driving and following units are located near the platform. The transmission operatively connects the following unit to the driving unit. The stoppers are connected to two portions of the transmission so that the stoppers are moved toward and away from each other by operating the driving unit.

9 Claims, 4 Drawing Sheets

BOTTLE STOPPING APPARATUS

BACKGROUND OF INVENTION

1. Field of Invention

The present invention relates to a bottle conveyor and, more particularly, to a bottle-stopping apparatus for such bottle conveyor.

2. Related Prior Art

A bottle conveyor for includes a platform and a bottle-stopping apparatus. The bottle-stopping apparatus includes two movable elements and two rods. The movable elements are movable on a side of the platform. Each of the rods is supported on a corresponding one of the movable elements. The gap between the rods is adjusted according to the total number and/or size of bottles to be stopped by the bottle-stopping apparatus. However, each of the movable elements is moved independent of the other movable element. Hence, it is difficult to retain a middle point between the rods. That is, the bottle-stopping apparatus is not precisely positioned. Moreover, the movable elements are moved one after another, and this takes a long period of time.

Therefore, the present invention is intended to obviate or at least alleviate the problems encountered in prior art.

SUMMARY OF INVENTION

It is the primary objective of the present invention to provide a bottle conveyor with an efficient and precise bottle-stopping apparatus.

To achieve the foregoing objective, the bottle-stopping apparatus includes a driving unit, a following unit, a transmission and two stoppers. The driving and following units are located near a platform of the bottle conveyor. The transmission operatively connects the following unit to the driving unit. The stoppers are connected to two portions of the transmission so that the stoppers are moved toward and away from each other by operating the driving unit.

In another aspect, the driving unit includes a driving pulley. The following unit includes a following pulley. The transmission includes a belt extending around the driving and following pulleys.

In another aspect, the transmission includes two connectors. The first connector connects a corresponding one of the stoppers to an upper section of the belt. The second connector connects the remaining one of the stoppers to a lower section of the belt.

In another aspect, the first connector includes two plates and several screws. The plates are located on two opposite sides of the belt. The screws drive the plates tightly against the belt.

In another aspect, the second connector includes two plates and several screws. The plates are located on two opposite sides of the belt. The screws drive the plates tightly against the belt.

In another aspect, the driving and following pulleys are located below the platform. The platform includes a lateral portion formed with an upper slot for receiving the first connector and a lower slot for receiving the second connector.

In another aspect, the driving unit further includes a driving axle for supporting the driving pulley and two bearings for supporting the driving axle.

In another aspect, the following unit further includes a following axle and a bearing. The following axle supports the following pulley. The bearing supports the following axle.

In another aspect, each of the stoppers includes a movable element, a post and a rod. The movable element is connected to a corresponding one of the first and second connectors. The post is movably connected to the movable element. The rod is movably connected to the post.

In another aspect, each of the stoppers further includes a clamp connected to the movable element and operable to hold the post.

In another aspect, each of the stoppers further includes a fastener rotatable in a direction to tighten the clamp to hold the post and rotatable in an opposite direction to loosen the clamp to allow the post to move.

In another aspect, each of the stoppers further includes a fastener rotatable in a direction to retain the rod in position and rotatable in an opposite direction to allow the rod to move.

In another aspect, the rod is movably connected to the post at an angle of about 90 degrees.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
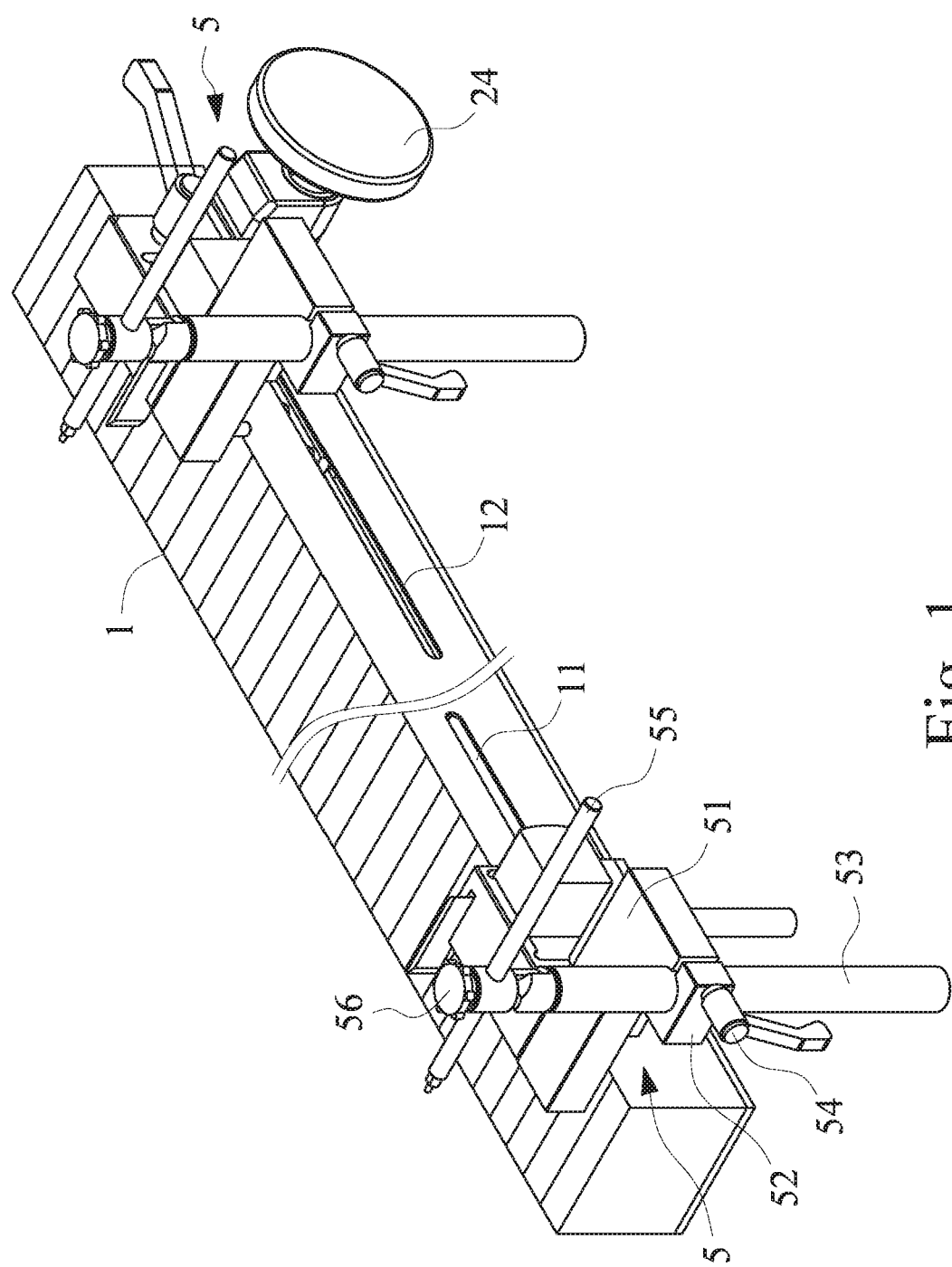
FIG. 1 is a perspective view of a portion of a bottle conveyor equipped with a bottle-stopping apparatus according to the preferred embodiment of the present invention.
Figure 2:
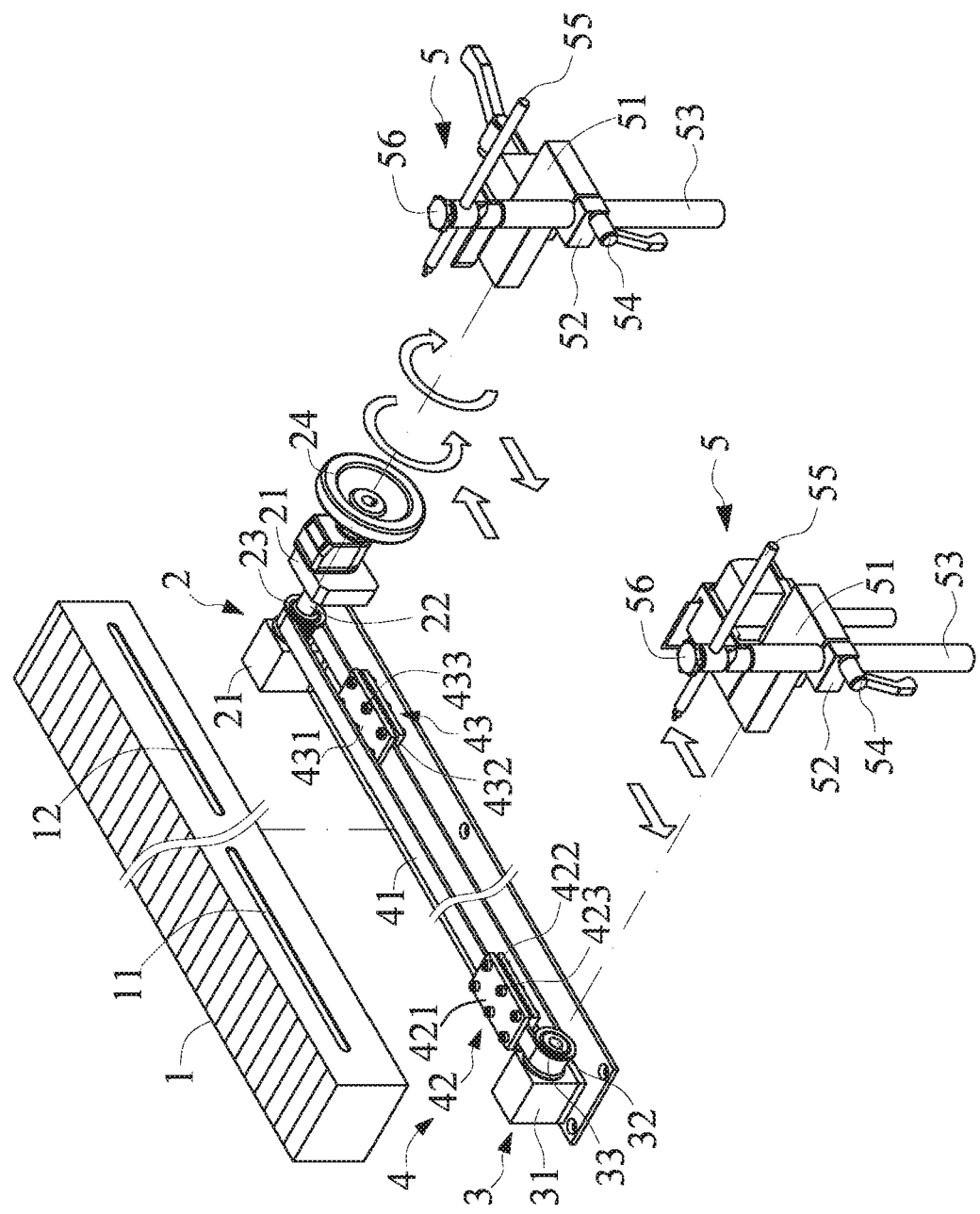
FIG. 2 is an exploded view of the bottle conveyor shown in FIG. 1.

Referring to FIGS. 1 and 2, a bottle conveyor includes a platform 1 and a bottle-stopping apparatus according to the preferred embodiment of the present invention. The bottle-stopping apparatus includes a driving unit 2, a following unit 3, a transmission 4 and two stoppers 5.

Figure 3:
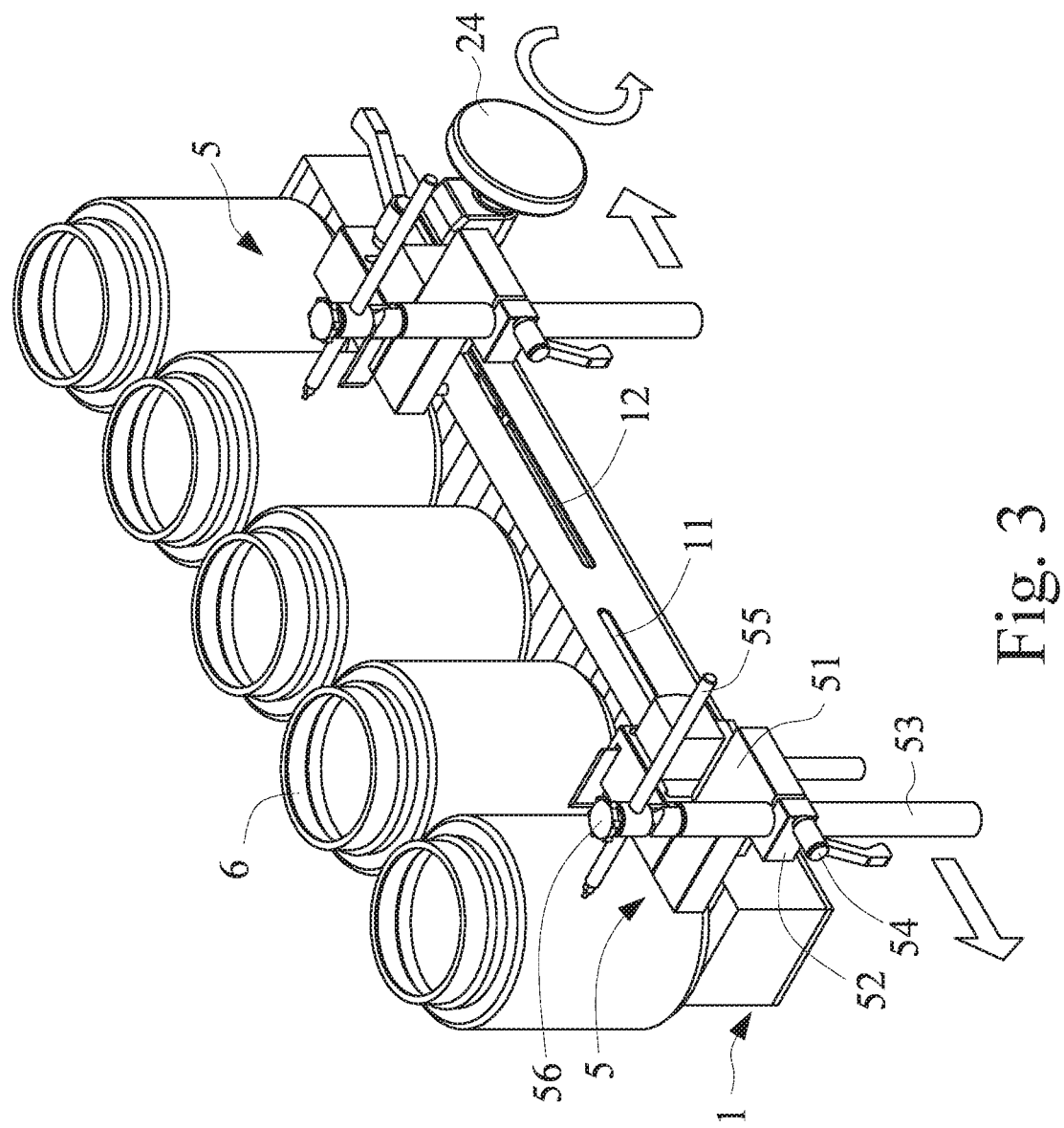
FIG. 3 is a perspective view of large bottles conveyed by the bottle conveyor shown in FIG. 1.
Figure 4:
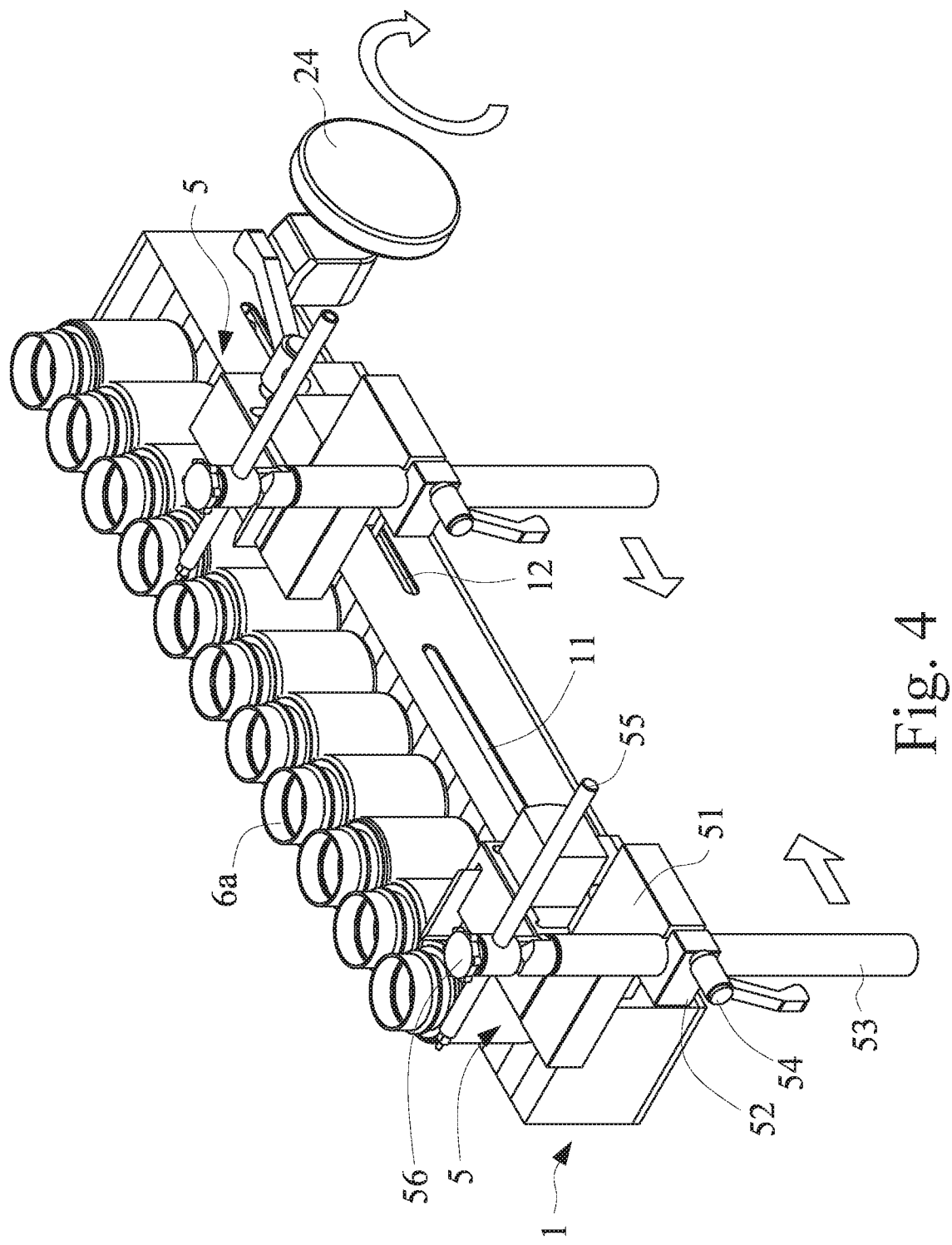
FIG. 4 is a perspective view of small bottles conveyed by the bottle conveyor shown in FIG. 1.

In operation, the platform 1 supports bottles such as large bottles 6 shown in FIG. 3 and small bottles 6A shown in FIG. 4. The platform 1 includes a lateral plate that includes two slots 11 and 12. The slots 11 are 12 are identical to each other in length. The slot 11 is located higher than the slot 12.

The driving unit 2 includes two bearings 21, a driving axle 22, a driving pulley 23 and a knob 24. One of the bearings 21 is located under the platform 1, and the other bearing 21 is located near the lateral wall of the platform 1. The driving axle 22 is supported on the bearings 21. The driving axle 22 extends through an aperture made in the lateral wall of the platform 1. The driving pulley 23 is supported on the driving axle 22. The driving pulley 23 is located beneath the platform 1. The knob 24 is connected to an end of the driving axle 22. The knob 24 is operable to rotate the driving axle 22. The knob 24 can be replaced with a lever or the like in another embodiment.

The following unit 3 includes a bearing 31, a following axle 32, a following pulley 33 and a knob 24. The bearing 31 is located under the platform 1. The following axle 32 is supported on the bearing 31. The following axle 32 extends through an aperture made in the lateral wall of the platform 1.

The transmission 4 includes a belt 41 and two connectors 42 and 43. The belt 41 is in the form of a loop extending around the driving pulley 23 and the following pulley 33 so that the driving axle 22 rotates the following axle 32 via the pulleys 23 and 33 and the belt 41.

The connector 42 includes two plates 421 and 422 connected to each other by several screws 423 for example. An upper section of the belt 41 is sandwiched between the plates 421 and 422 so that the connector 42 is connected to the belt 41.

The connector 43 includes two plates 431 and 432 connected to each other by several screws 433 for example. A lower section of the belt 41 is sandwiched between the plates 431 and 432 so that the connector 43 is connected to the belt 41.

In assembly, the belt 41 is located under the platform 1. The connector 42 extends through the slot 11. The connector 43 extends through the slot 12.

Each of the stoppers 5 includes a movable element 51, a clamp 52, a post 53, a fastener 54, a rod 55 and a fastener 56. The movable element 51 is connected a corresponding one of the connectors 42 and 43 so that they are movable together with each other.

The clamp 52 is connected to the movable element 51. The clamp 52 holds the post 53. The fastener 54 is rotatable in a direction to tighten the clamp 52 to keep the post 53 in position. The fastener 54 is rotatable in an opposite direction to loosen the clamp 52 to allow the post 53 to move. The fastener 54 preferably includes a lever. However, the fastener 54 can include a knob in another embodiment.

The rod 55 is movably connected to the post 53 at an angle of about 90 degrees. The fastener 56 is rotatable in a direction to retain the rod 55 in position. The fastener 56 is rotatable in an opposite direction to allow the rod 55 to move. The fastener 56 preferably includes a knob. However, the fastener 56 can include a lever in another embodiment.

As discussed above, the clamp 52 and the fastener 54 are operable to adjust height of an operative end of the rod 55 via the post 53 according to the size of bottles to be stopped by the bottle-stopping apparatus. Moreover, distance of the operative end of the rod 55 from the post 53 is adjustable corresponding to the size of the bottles to be stopped by the bottle-stopping apparatus.

Referring to FIG. 3, the large bottles 6 are conveyed by the bottle conveyor. The knob 24 is operable to move the posts 53 away from each other, thereby increasing the gap between the posts 53 in compliance with the width of the large bottles 6. The stoppers 5 are moved away from each other as indicted by two arrowheads as the knob 24 is rotated counterclockwise as indicated by another arrowhead.

Referring to FIG. 4, the small bottles 6a are conveyed by the bottle conveyor. The knob 24 is operable to move the posts 53 toward each other, thereby reducing the gap between the posts 53 in compliance with the width of the small bottles 6a. The stoppers 5 are moved toward each other as indicted by two arrowheads as the knob 24 is rotated clockwise as indicated by another arrowhead.

Advantageously, the knob 24 is operable to synchronously move the stoppers 5 due to the use of the belt 41 to connect the driving pulley 23 to the following pulley 33. Hence, the adjustment of the locations of the stoppers 5 is efficient. Moreover, the stoppers 5 are always moved for a same distance for using the belt 41 to connect the driving pulley 23 to the following pulley 33. That is, a middle point between the operative ends of the rods 55 is not moved. Therefore, the adjustment of the locations of the stoppers 5 is precise.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A bottle-stopping apparatus for a bottle conveyor comprising:
    a platform for supporting bottles;
    a driving unit adjacent to the platform and comprising a driving pulley;
    a following unit adjacent to the platform and comprising a following pulley;
    a transmission comprising a belt extending around the driving and following pulleys and two connectors each of which connectors comprises two plates located on two opposite sides of the belt and several screws for driving the plates tightly against the belt; and
    two stoppers connected to the connectors of the transmission so that the stoppers are moved toward and away from each other by operating the driving unit.

2. The bottle-stopping apparatus according to claim 1, wherein the driving unit further comprises a driving axle for supporting the driving pulley and two bearings for supporting the driving axle.

3. The bottle-stopping apparatus according to claim 1, wherein the following unit further comprises a following axle for supporting the following pulley and a bearing for supporting the following axle.

4. A bottle-stopping apparatus comprising:
    a platform for supporting bottles and comprising a lateral portion formed with two slots;
    a driving unit comprising a driving pulley located below the platform;
    a following unit comprising a following pulley located below the platform;
    a transmission comprising a belt wound on the driving and following pulleys and two connectors inserted in the slots respectively; and
    two stoppers connected to the connectors respectively so that the stoppers are moved toward and away from each other by operating the driving unit.

5. A bottle-stopping apparatus comprising:
    a platform for supporting bottles;
    a driving unit located adjacent to the platform;
    a following unit located adjacent to the platform;
    a transmission for connecting the following unit to the driving unit; and
    two stoppers each of which comprises:
        a movable element connected to a portion of the transmission so that the stoppers are moved toward and away from each other by operating the driving unit;
        a post movably connected to the movable element; and
        a rod movably connected to the post.

6. The bottle-stopping apparatus according to claim 5, wherein each of the stoppers further comprises a clamp connected to the movable element and operable to hold the post.

7. The bottle-stopping apparatus according to claim 6, wherein each of the stoppers further comprises a fastener rotatable in a direction to tighten the clamp to hold the post and rotatable in an opposite direction to loosen the clamp to allow the post to move.

8. The bottle-stopping apparatus according to claim 5, wherein each of the stoppers further comprises a fastener rotatable in a direction to retain the rod in position and rotatable in an opposite direction to allow the rod to move.

9. The bottle-stopping apparatus according to claim 5, wherein the rod is movably connected to the post at an angle of about 90 degrees.

\* \* \* \* \*